United States Patent [19]
Haselden, Jr.

[11] Patent Number: 6,024,780
[45] Date of Patent: Feb. 15, 2000

[54] METHOD AND APPARATUS FOR DEGASSING A FLUID IN A REUSABLE VACCUM CHAMBER WITH MICROPROCESSOR BASED CONTROLS

[76] Inventor: Odell Kent Haselden, Jr., 1206 Mathis Ferry Rd., Mt. Pleasant, S.C. 29464

[21] Appl. No.: 09/082,294

[22] Filed: May 19, 1998

[51] Int. Cl.[7] .................................................. B01D 19/00
[52] U.S. Cl. .................................. 95/26; 95/260; 95/266; 96/196; 96/204; 96/413; 96/424; 73/863.21
[58] Field of Search .............................. 95/247, 248, 260, 95/266, 242, 26; 96/156, 193, 194, 195, 196, 155, 413, 204, 216, 217, 424, FOR 167, 177, 176; 261/DIG. 19; 73/863.21

[56] References Cited

U.S. PATENT DOCUMENTS

| | | | |
|---|---|---|---|
| 2,119,347 | 5/1938 | Page et al. | 257/89 |
| 2,908,652 | 10/1959 | Forrester | 252/321 |
| 3,229,449 | 1/1966 | Hogue | 96/215 |
| 3,676,983 | 7/1972 | Nold | 96/196 |
| 3,832,474 | 8/1974 | Karr | 426/477 |
| 3,877,258 | 4/1975 | Karr | 99/275 |
| 4,201,555 | 5/1980 | Tkach | 95/15 |
| 4,266,950 | 5/1981 | Makino et al. | 261/93 |
| 5,290,340 | 3/1994 | Gatten et al. | 96/155 |

FOREIGN PATENT DOCUMENTS

| | | | |
|---|---|---|---|
| 2949411 | 6/1980 | Germany | 96/177 |
| 2-71804 | 3/1990 | Japan | 96/176 |

*Primary Examiner*—David A. Simmons
*Assistant Examiner*—Robert A. Hopkins
*Attorney, Agent, or Firm*—Harleston Law Firm; Kathleen M. Harleston

[57] ABSTRACT

An automatic apparatus for substantially reducing gas levels in a fluid is provided. The apparatus comprises: (a) an upper portion comprising a reusable vacuum chamber with a resealable opening thereto; the vacuum chamber being capable of containing a suitable vessel holding a sample of the fluid; and (b) an enclosed lower portion comprising: (1) a magnetic stirrer positioned below the vacuum chamber; (2) mechanism for applying a vacuum in the vacuum chamber; (3) a microprocessor for controlling timing sequences for the magnetic stirrer and the vacuum means; and (4) one or more control switches or dials accessible to the user for selecting the timing sequences. A method for substantially reducing carbon dioxide levels in a pre-measured sample of a carbonated beverage is also provided.

15 Claims, 2 Drawing Sheets

METHOD AND APPARATUS FOR DEGASSING A FLUID IN A REUSABLE VACCUM CHAMBER WITH MICROPROCESSOR BASED CONTROLS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Technical Field

The present invention relates to an automatic apparatus and method for reducing or eliminating entrapped gases from fluids, in particular for substantially reducing or eliminating entrapped carbon dioxide in samples of carbonated liquids.

2. Background Information

In the carbonated beverages industry, product is periodically tested to assure consistent product quality. Quality control testing is often conducted in a laboratory at or near the product manufacturing location. One problem laboratory personnel face is that it is difficult to test a beverage or other liquid which contains entrapped gasses. This is because gasses can interfere with the standardized laboratory tests to be conducted. Therefore, the gas must first be driven off so that testing can proceed on product samples which have been substantially degassed. This is also true for other industries which must test gas-containing fluids. In the carbonated beverages industry, for example, carbon dioxide in a sample must be substantially reduced before quality control testing of carbonated beverages can proceed. Traditional methods for degassing include repeatedly pouring the carbonated beverage between two containers to drive off the gas. Another conventional method is agitation of the sample in an industrial blender, which ordinarily takes about 10 or 15 minutes.

The apparatus of the present invention provides a fast, accurate, and sanitary means of extracting carbon dioxide or other gases from beverages and other fluids. In the present invention, gas is driven off quickly from a beverage sample by a combination of vacuum and agitation, which are applied at approximately the same time. A beaker containing a sample is easily placed into and then removed from the vacuum chamber, so a series of samples can be degassed in a relatively short period of time. If the sample was instead placed in a single test vessel, the test vessel would have to be cleaned between tests. Degassing under a controlled set of conditions is necessary for holding test variables constant in order for subsequent testing to be accurate. The present apparatus and method allow a series of test samples to be degassed, all under the same vacuum and agitation conditions and for the same length of time. Consistent results can therefore be obtained using the present invention, even when different laboratory technicians are doing the testing.

The present apparatus (or instrument) substantially reduces the levels of carbon dioxide or other gas in a fluid. The apparatus comprises:

a) a microprocessor for controlling timing sequences;
b) means for mechanically agitating the fluid; and
c) mechanism for pulling a vacuum over the fluid.

Advantages of a beverage decarbonator according to the present invention over conventional devices and methods for decarbonation include: 1) controlled conditions and consistent repeatability between tests, 2) the standard deviation of carbon dioxide content between samples is reduced, 3) savings in labor of laboratory and plant personnel, and 4) decreased amount of down time because samples are degassed within a few minutes.

To use the preferred instrument of the present invention, a sample of the carbonated beverage to be tested is measured into a 500 milliliter beaker, a standard sized magnetic stir bar is added to the beaker, and the beaker is placed in the vacuum chamber of the instrument. The user turns a dial on the face of the instrument to select a program. Preferably, the user chooses "normal" or "titratable acidity" using this first dial, depending upon which tests will be conducted with the sample. The user then turns a second dial to "on" to initiate operation of the apparatus. Agitation begins as a vacuum is pulled in a vacuum chamber. After approximately one to two minutes, the beverage sample has been degassed and the sample can be further tested.

BRIEF SUMMARY OF THE INVENTION

This invention is an automatic apparatus for substantially reducing gas levels in a fluid, and a method for substantially reducing carbon dioxide levels in a pre-measured sample of a carbonated beverage. The apparatus comprises: (a) an upper portion comprising a reusable vacuum chamber with a resealable opening thereto; the vacuum chamber being capable of containing a suitable vessel holding a sample of the fluid; and (b) an enclosed lower portion comprising: (1) a magnetic stirrer positioned below the vacuum chamber; (2) means for applying a vacuum in the vacuum chamber; (3) a microprocessor for controlling timing sequences for the magnetic stirrer and the vacuum means; and (4) one or more control switches or dials accessible to the user for selecting the timing sequences.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
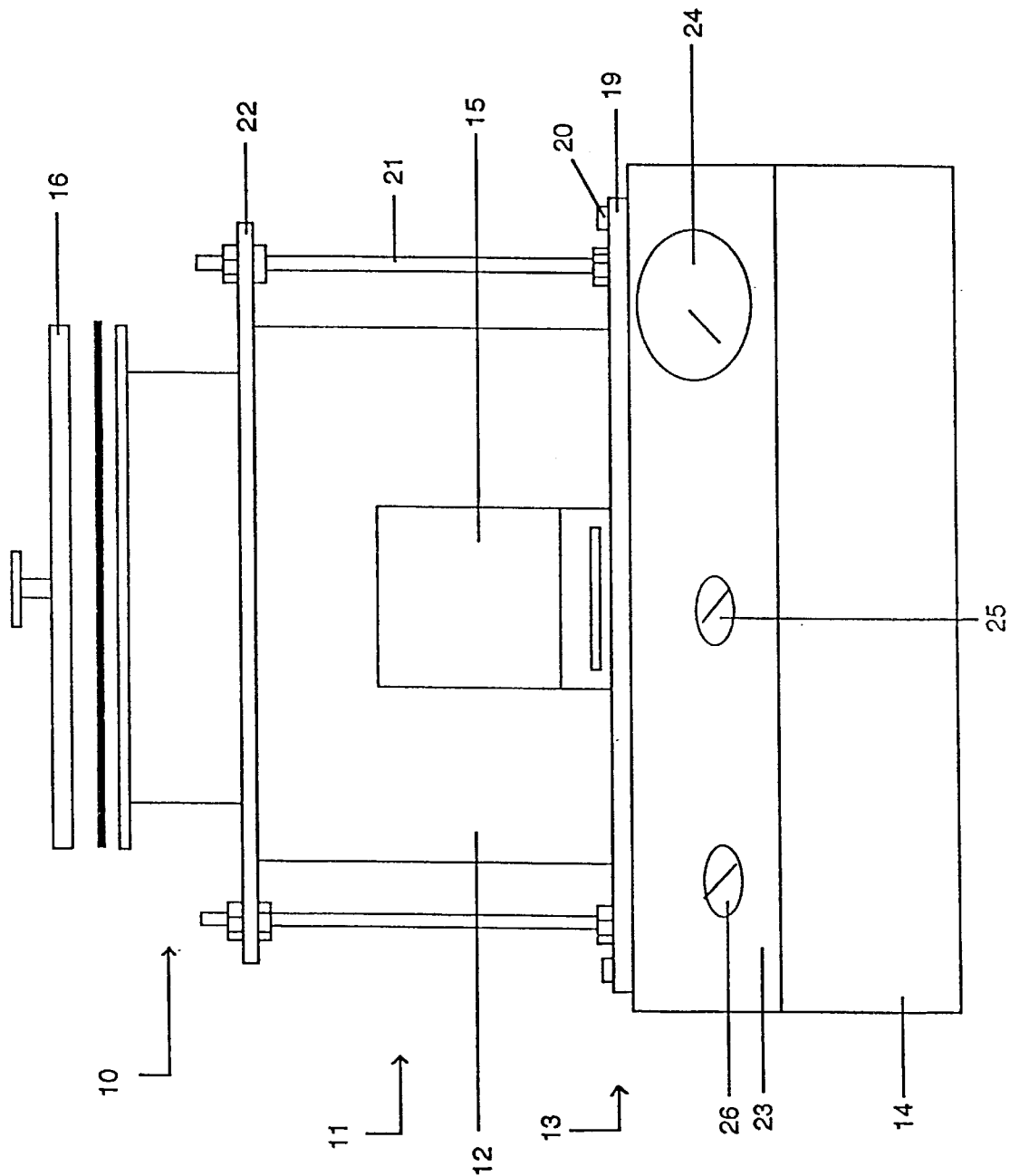
FIG. 1 shows a perspective view of an apparatus according to the present invention, showing the front of the apparatus.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Referring to FIG. 1, the present apparatus for degassing a fluid is shown from the front. The top portion of the apparatus 10 is the vacuum portion 11, which primarily comprises a circular vacuum chamber 12. The vacuum chamber 12 is hollow and is preferably bounded by a sturdy clear plastic and/or glass material. The bottom instrument portion 13 of the apparatus comprises the components of the apparatus 10 and the instrument housing 14. In use, a standard 500 milliliter glass laboratory beaker 15 containing the desired amount of the fluid to be tested is placed inside the vacuum chamber 12 through an opening in the top of the chamber. An enclosure top 16 is placed back over the top opening once the beaker 15 is inside the vacuum chamber 12. The enclosure top 16 preferably has a knob or other type of handle in the center of the top for easier handling.

Figure 2:
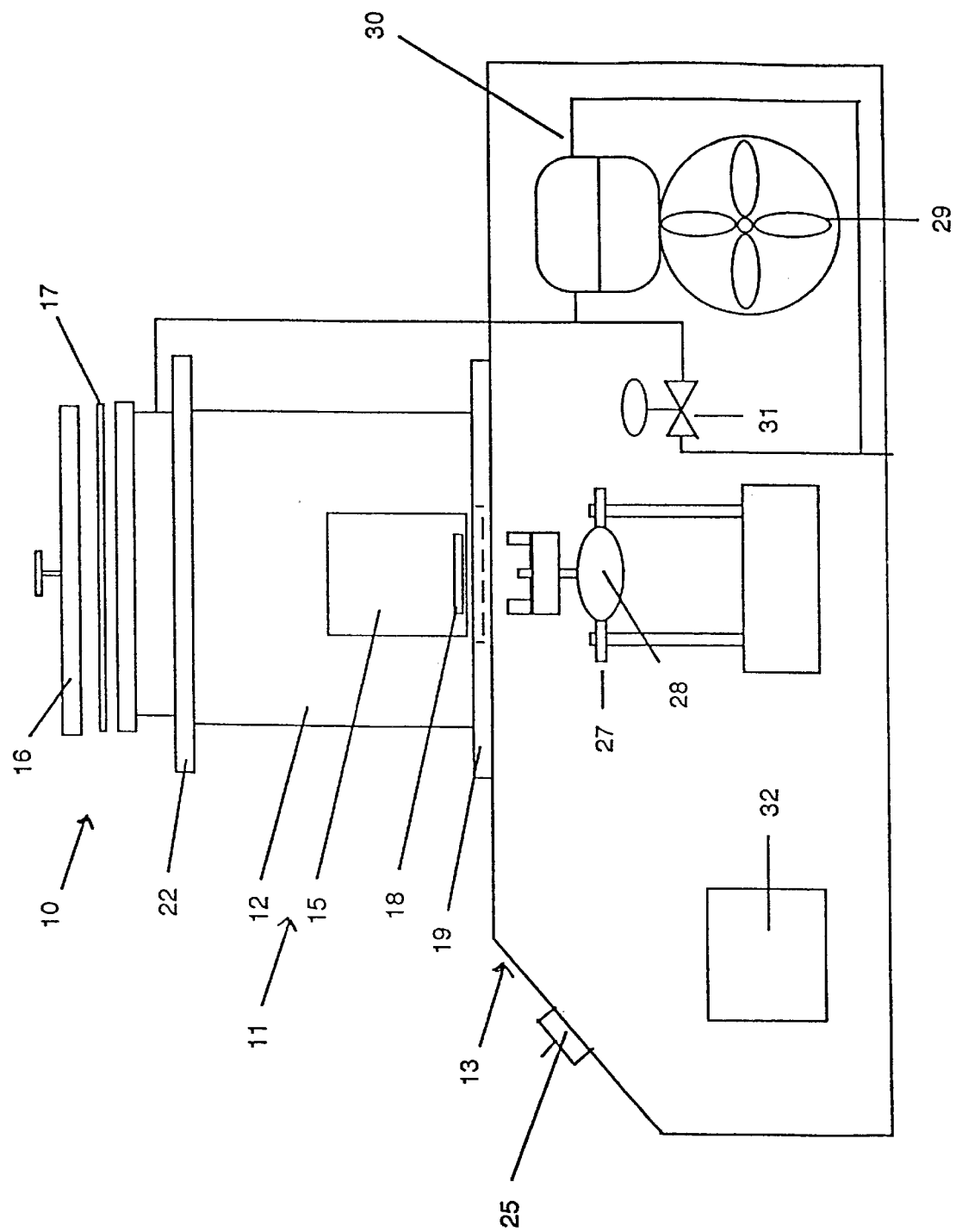
FIG. 2 is a side view of an apparatus according to the present invention, showing the components inside the apparatus.

Referring to FIG. 2, which shows the lay-out of the components inside the bottom instrument portion 13, the enclosure top 16 is placed on (or comprises) a circular enclosure gasket 17. The enclosure gasket 17 ensures that the vacuum chamber 12 will be airtight when a vacuum is pulled. The beaker 15 contains a measured amount, usually between about 100 and 200 milliliters, of the fluid to be tested, as well as a standard magnetic stir bar 18 which is suitably sized for the beaker 15.

Referring back to FIG. 1, there is a rectangular-shaped metal plate 19 at the bottom of the vacuum portion 11 of the apparatus 10. The metal plate 19 is bolted on at it four corners to the bottom instrument portion 13 with removable screws and nuts 20. The metal plate 19 preferably includes a circular depression in the approximate center of the plate. The depression has approximately the same diameter as the beaker 15. The beaker is placed into the depression, which helps to hold the beaker steady even during stirring.

The vacuum chamber 12 is affixed to the remainder of the apparatus 10 by means of four vertically placed metal bars 21. The vertical metal bars 21 are affixed at their bottom ends to the metal plate 19 and at their opposite, upper ends to a circular metal halo 22 by means of screws and nuts.

As is shown in FIG. 1, the face 23 of the instrument portion 13 comprises two dials, or switches, and a gauge. The vacuum gauge 24 indicates for the user the amount of vacuum being pulled in the vacuum chamber 12 in inches of Mercury (in. Hg). When the needle in the vacuum gauge 24 is at zero, it indicates that no vacuum is being applied in the vacuum chamber 12 and the sample beaker 15 can safely be removed from, or inserted in, the vacuum chamber.

Once the sample beaker 15 is in the vacuum chamber 12 and the enclosure top 16 has been replaced, the user turns a first dial 25 on the face 23 to select one of two program settings. Preferably, the present apparatus substantially reduces carbon dioxide levels in soda samples so that one of two laboratory tests can be performed separately, after degassing, on the samples. The first test is a Color test, which is also called a Brix test, and is often used on regular, sugar-containing, carbonated beverages. For a Brix test, the "Normal" setting on the first dial 25 is used. This setting initiates a one step timing sequence. When the "normal" setting is used, the test sample will be stirred and the vacuum will be applied for between about 30 and 60 seconds, most preferably for approximately 40 seconds. The majority of the carbon dioxide will be driven off after this cycle in the present apparatus. The degassed sample can then be taken elsewhere in the laboratory and the Brix test will be performed.

The second laboratory test is a titratable acidity test, which employs a three step timing sequence and is often performed on diet carbonated beverages. In a titratable acidity test, a chemical indicator will be titrated into the decarbonated soda sample. The test sample will show color once a certain amount of indicator solution has been added. By ascertaining the amount of the chemical indicator which was titrated into the test sample, the laboratory technician can determine the pH of the test sample. This test is more sensitive to carbon dioxide levels, so more carbon dioxide must be eliminated from the sample before the titratable acidity test can be accurately performed.

Thus, the user chooses either the "normal" or "titratable acidity" setting using this first dial 25. After double checking that the chamber is sealed, e.g., the enclosure top has been placed tightly onto the chamber, the user turns a second dial 26 from "stop/reset" to "on" to initiate operation of the apparatus. The second dial 26 is located on the face 23 of the instrument portion 13 next to the first dial 25. Agitation begins as a vacuum is pulled in the vacuum chamber 12. After between about 20 seconds and four minutes, the beverage will have been degassed to a desired low level.

Referring to FIG. 2, beneath the metal plate 19 is a standard magnetic stirrer 27. The magnetic stirrer 27 is one of the components located inside the instrument portion 13 of the apparatus 10 approximately in the center. It comprises a magnetic stirrer motor 28. When the second dial 26 is turned to "on," the magnetic stirrer 27 is also turned on, which begins rotation of the magnetic stir bar 18 in the sample which is on the metal plate 19. Preferably, the magnetic stirrer 27 rotates at between about 1800 and 2200 revolutions per minute (RPMs).

The turning of the second dial 26 to "on" also initiates action of the vacuum pump 29, which is located at the back of the instrument portion 13. The vacuum pump 29 is connected to a vacuum pump exhaust 30, which is located above the vacuum pump 29 and vents outside the apparatus 10 to the rear, and a relief sylenoid valve 31. The vacuum pump 29 is connected to and removes air gradually and steadily from the vacuum chamber 12 via a vacuum supply line. Once the prescribed vacuum interval has ended, the vacuum pump 29 shuts down and ambient air seeps back into the vacuum chamber 12. Preferably, the maximum vacuum pressure in the vacuum chamber ranges between about 25 and 30 inches of Mercury. The maximum vacuum pressure is most preferably 28 inches of Mercury. After approximately 40 seconds to three minutes in the present apparatus, the average level of carbon dioxide in a sample of approximately 100 milliliters of an average decarbonated beverage sample is substantially reduced.

Timing of the magnetic stirrer 27 and the vacuum pump 29 are controlled by a microprocessor 32. This includes the initiation and shutting down of the stirrer and vacuum and the amounts and duration in between start and finish. The length of time for the procedure depends upon the selection made by the user with the first dial 25. The microprocessor 32 is located in the front of the instrument portion 13 of the apparatus 10.

The vacuum acts to remove carbon dioxide, or other entrained or dissolved gasses, from the carbonated sample, or other type of sample fluid. The stirring motion also helps to physically drive off the gas and to expose the fluid more evenly to the vacuum. The combination of this amount of stirring and this vacuum level help to substantially degas the sample quickly and effectively. By holding down the time required for degassing, more time is allowed for the laboratory technician(s) to conduct the necessary laboratory tests. Time may be of critical importance, particularly where a manufacturing run is being held up pending results from "QC" (the Quality Control laboratory). A slow degassing procedure could thus hinder production of, for example, a carbonated beverage. Also, instead of having to use a stirrer device and then a vacuum apparatus separately, in the present invention, the necessary components are located within the same housing within the same apparatus.

Another advantage of the present invention is that is automatic, which saves time and helps to standardize the degassing procedure. Vacuum and agitation are initiated at substantially the same time and they are timed. Standardization is of importance because subsequent laboratory tests are more reliable if approximately the same amount of degassing occurs with each sample. When the apparatus and the procedure are automatic, the same amount of stirring takes place and the same amount of vacuum pressure is applied to the same amount of premeasured test sample each time. There is no need for the technician to look up a degassing procedure in a procedure book. Also, sometimes different technicians have different ways of doing things and laboratory results can differ between technicians. With the present apparatus and procedure, results are consistent between technicians.

Another advantage of the apparatus of this invention is that many samples can be successively tested in the same vacuum chamber. There is no need to clean out the chamber between samples because the samples are put into the chamber in separate beakers. Samples can be changed without contaminating the vacuum chamber. There is no need to recalibrate instruments between samples. The user merely measures the sample into the beaker, adds the stir bar, puts the sample beaker into the vacuum chamber, puts the cover back on the vacuum chamber, selects the setting on the first dial, and turns the second dial to "on." A few minutes later, the apparatus indicates when the degassing procedure is over and the user removes the sample beaker and conducts the desired further testing. The sample beaker and the vacuum chamber do not contain internal grooves, nor is bubbling gas fed into the sample. In addition to carbon dioxide, the present apparatus and method can be used to reduce levels of, for example, hydrogen sulfide, ammonia, and the oxides of nitrogen and sulfur in fluids.

The present invention also includes an automatic method for substantially reducing carbon dioxide levels in a premeasured sample of a carbonated beverage. The method comprises the following steps:

(a) Placing a magnetic stir bar into a beaker, or other suitable vessel, containing the pre-measured sample of the carbonated beverage;

(b) Inserting the beaker containing the beverage sample into a vacuum chamber of an automatic degassing apparatus and sealing the vacuum chamber;

(c) Selecting an automatic timing program by means of one or more control switches or dials;

(d) Turning a control switch or dial which starts a microprocessor in the apparatus which controls the selected automatic timing program for a magnetic stirrer and a vacuum pump in the apparatus;

(e) Stirring the sample by rotating a magnetic stir bar about an axis parallel to the bottom of the sample vessel using the magnetic stirrer; and (f) Applying a vacuum in the vacuum chamber using the vacuum pump, the vacuum and stirring motion being applied at approximately the same time. The stirring motion and the application of the vacuum in the vacuum chamber preferably continue for approximately the same length of time. Preferably, the maximum vacuum pressure in the vacuum chamber ranges between about 25 and 30 inches of Mercury. Preferably, when the apparatus is on, the magnetic stir bar in the beverage sample in the vacuum chamber rotates in a circular motion at between about 1800 and 2200 revolutions per minute. This method preferably further comprises step (g): Halting the vacuum and stirring motion and opening (default position) the vacuum relief valve (which is preferably a relief sylenoid valve) for between about 20 seconds and four minutes, then closing the vacuum relief valve and resuming the vacuum and stirring for between about 20 seconds and four minutes. This method also preferably further comprises step (h) Removing the vessel from the chamber after the automatic timing program ends and the apparatus turns off, and subjecting the sample in the vessel to further laboratory testing. A series of samples can be degassed rapidly without having to decontaminate the vacuum chamber. Unless there is a spill, the vacuum chamber remains clean. If there is a spill, the chamber can easily be wiped clean.

When the titratable acidity setting is chosen, as it often is for diet soda samples, the microprocessor initiates a three or four step timing sequence. The preferred timing sequence is 40 seconds on, 12 seconds off, 30 seconds on, 12 seconds off, 30 seconds on. A fourth cycle: 12 seconds off and 30 seconds on, is most preferred.

These timed cycles allow a vacuum to be pulled, after which the carbon dioxide is periodically expelled from the vacuum chamber before the cycle is repeated. If the gas is not periodically expelled, a small amount may be resorbed into the beverage solution, which may leave the gas level in the sample too high for the titratable acidity test to be accurately performed after the sample is removed from the vacuum chamber. The apparatus preferably comprises a device which comprises a vacuum pump and a relief valve along the vacuum line which is automatically closed while the vacuum pump is on and defaults to the open position while the vacuum pump is off. When the apparatus is "on," the stirrer and vacuum pump are both on and the relief valve, preferably a relief sylenoid valve, is closed. When the apparatus is "off," the stirrer and vacuum pump are off and the relief sylenoid valve defaults to the open position. When the relief sylenoid valve is open, the carbon dioxide inside the vacuum chamber escapes to the environment and the ambient air enters the vacuum chamber. The relief sylenoid valve is of course closed when the vacuum is being pulled. The microprocessor is set to automatically initiate these functions. Although the amounts of carbon dioxide which escape to the atmosphere are small, a scrubber could be added to the present apparatus depending upon the type of gas to be released.

As noted herein, the two control switches or dials on the front of the apparatus allow the user to select an automatic timing program, and the first control switch or dial allows the user to select either a one step timing sequence of between about 30 and 60 seconds for a substantial reduction of carbon dioxide level in the carbonated beverage sample, or a three or four step timing sequence for substantially eliminating carbon dioxide from the carbonated beverage sample. The three or four step timing sequence comprises at least two sequential cycles of between about 20 and about 50 seconds during which the apparatus is automatically switched on, and between about 10 and 30 seconds during which the apparatus is automatically switched off, wherein the magnetic stirrer and the vacuum pump are automatically activated when the apparatus is on. The microprocessor controls the magnetic stirrer, the vacuum pump and the relief sylenoid valve. The second control switch or dial allows a user to turn the apparatus on or off.

There are preferably two side control dials, which are ordinarily on the side of the apparatus and are covered by protective clips. The user can uncover these side control dials and rotate them clockwise or counterclockwise to change the automatic settings of the apparatus. Preferably, one dial controls the "normal" setting and one controls the "titratable acidity" setting. The approximately 30 to 60 second period in the apparatus (normal setting) substantially reduces levels of carbon dioxide from the carbonated beverage sample, and the three or four step timing sequence substantially eliminates carbon dioxide from the sample. After a "normal" cycle, it is believed that less than a few percent of $CO_2$ remains, and after the "titratable acidity" cycles, a negligible amount, less than about 1%, $CO_2$ remains entrained in the sample. The three or four cycles of the "titratable acidity" setting take about three minutes.

A slower stirring action is preferred for the "normal" setting. This is because the preferred 100 milliliters of regular, sugar-containing sodas often foam up during stirring and may overflow the 500 milliliter beaker.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

What is claimed is:

1. An automatic apparatus for substantially reducing gas levels in a fluid, the apparatus comprising:

(a) an upper portion comprising a reusable vacuum chamber with a resealable opening thereto; the vacuum chamber being capable of containing a sample vessel holding a sample of the fluid; and (b) an enclosed lower portion having a substantially horizontal bottom; the lower portion comprising (1) a magnetic stirrer positioned below the vacuum chamber, the magnetic stirrer being suitable for rotating a magnetic stir bar about an axis parallel to the bottom of the sample vessel; (2) mechanism for applying a vacuum in the vacuum chamber; (3) a microprocessor for controlling timing sequences for the magnetic stirrer and the vacuum mechanism; and (4) one or more control switches or dials accessible to the user for selecting the timing sequences.

2. An apparatus according to claim 1, wherein the gas is carbon dioxide and the fluid is a carbonated beverage.

3. An apparatus according to claim 2, wherein the sample vessel is a beaker, the mechanism for applying a vacuum in the vacuum chamber is a device which comprises a vacuum pump, and the vacuum is sufficient to significantly reduce the amount of carbon dioxide in the carbonated beverage sample.

4. An apparatus according to claim 3, wherein the vacuum pump device further comprises a relief valve, the relief valve being closed automatically while the vacuum pump is on and open while the vacuum pump is off.

5. An apparatus according to claim 4, wherein the sample vessel is a 500 milliliter glass beaker.

6. An apparatus according to claim 5, wherein two control switches or dials on the front of the apparatus allow the user to select an automatic timing program, and wherein a first control switch or dial allows the user to select either a one step timing sequence of between about 30 and 60 seconds for a substantial reduction of carbon dioxide level in the carbonated beverage sample, or a three or four step timing sequence for substantially eliminating carbon dioxide from the carbonated beverage sample.

7. An apparatus according to claim 6, wherein a second control switch or dial allows a user to turn the apparatus on or off.

8. An apparatus according to claim 7, wherein the three or four step timing sequence comprises at least two sequential cycles of between about 20 and about 50 seconds during which the apparatus is automatically switched on, and between about 10 and 50 seconds during which the apparatus is automatically switched off, wherein the magnetic stirrer and the vacuum pump are automatically activated when the apparatus is on.

9. An apparatus according to claim 8, further comprising a vacuum gauge on the front of the apparatus, the vacuum gauge being a portion of a system which continuously measures the amount of vacuum pressure inside the vacuum chamber.

10. An automatic method for substantially reducing carbon dioxide levels in a pre-measured sample of a carbonated beverage, the method comprising the following steps:

(a) Placing a magnetic stir bar into a sample vessel, containing the pre-measured sample of the carbonated beverage;

(b) Inserting the sample vessel containing the beverage sample into a vacuum chamber of an automatic degassing apparatus and sealing the vacuum chamber;

(c) Selecting an automatic timing program by one or more control switches or dials;

(d) Turning a control switch or dial which starts a microprocessor in the apparatus which controls the selected automatic timing program for a magnetic stirrer and a vacuum pump in the apparatus;

(e) Stirring the sample by rotating a magnetic stir bar about an axis parallel to the bottom of the sample vessel using the magnetic stirrer; and (f) Applying a vacuum in the vacuum chamber using the vacuum pump, the vacuum and stirring motion being applied at approximately the same time.

11. A method according to claim 10, wherein the stirring motion and the application of the vacuum in the vacuum chamber are approximately simultaneous and continue for between about 20 seconds and four minutes.

12. A method according to claim 11, wherein the maximum vacuum pressure in the vacuum chamber ranges between about 25 and 30 inches of Mercury.

13. A method according to claim 12, wherein, when the apparatus is on, the magnetic stir bar in the beverage sample in the vacuum chamber rotates in a circular motion at between about 1800 and 2200 revolutions per minute.

14. A method according to claim 12, further comprising step (g) Halting the vacuum and stirring and opening the vacuum relief valve for between about 20 seconds and four minutes, then closing the vacuum relief valve and resuming the vacuum and stirring for between about 20 seconds and four minutes.

15. A method according to claim 14, further comprising step (h) Removing the vessel from the chamber after the automatic timing program ends and the apparatus turns off, and subjecting the sample in the vessel to further laboratory testing.

* * * * *